Patented Jan. 5, 1937

2,066,798

UNITED STATES PATENT OFFICE 2,066,798

RUBBER MOLDING

Francis Norman Pickett, Westminster, London, England

No Drawing. Application November 9, 1934, Serial No. 752,367. In Great Britain November 16, 1933

1 Claim. (Cl. 18—59)

This invention relates to rubber molding and powders therefor, and has for its object to provide a method of and means for molding rubber, either hard or soft, so that different parts of a molding may be composed of rubber possessing different characteristics and/or composition to rubber in another part of the same molding.

The invention may be applied to the manufacture of such objects as tiles, flooring and paving blocks, typewriter mats etc. where a polished hard rubber or ebonite face is required but with the base of a softer more resilient rubber, or vice versa.

A rubber molding powder consisting of rubber preferably prevulcanized reduced to powder and then mixed with preferably about 3 per cent of diphenylguanidine or other guanidine derivatives in powder form is found to produce a perfect molding on being subjected to heat and pressure in a mold.

The hardness and resiliency of the resulting molding is determined by the state of the prevulcanized powder before the diphenylguanidine is added. Thus a soft rubber powder such as ground tyre tread rubber will produce a soft resilient molding, while a hard rubber or ebonite powder will produce a hard rubber or ebonite molding indistinguishable from one produced in the ordinary manner by compounding crude rubber, sulphur, fillers and accelerators and then curing.

To produce an object having a resilient base and hard face, or vice versa, I place a molding powder made from a soft rubber in the base of a plunger type mold and then molding powder made from a hard rubber on top of this. The mold is then closed and placed under pressure and at the plane of contact, the two powders become intermixed and a strong bond is formed between the two so that on hardening or vulcanization the hard rubber grades into the soft rubber without forming a plane of cleavage, and a molding is formed having soft rubber at the base and an ebonite face.

It will be obvious that alternate layers of hard and soft molding powders may be used, up to any reasonable numbers to produce a sandwich like effect. Moreover, by the foregoing method composite articles can be molded consisting of rubber compositions and synthetic resinous compositions. Such an arrangement would have manifest advantages. For example moldings of the material sold under the registered trademark "Bakelite" could be provided with soft rubber bases.

In the case of flooring blocks I make a layer of hard rubber on the bottom of the block, shaped in such a manner that a projection on one block fits into a recess on the neighbouring block, so forming a key or anchor.

It is also a feature of the invention that various fillers, wear resisting material such as carbon black, abrasives or non-slip materials may be incorporated in the molding powders either hard or soft.

The invention may be used in situ in cases where this is desirable or necessary. For example in the case of iron or concrete roadways where a hard or soft rubber surface is required, I provide that the iron or concrete is built so that the surface consists of a series of cells which may be any desired shape or size. These cells have holes or recesses running out of them such that when the molding powder which may be either wholly hard or soft or a combination of both, is put into the cells that a portion will run into these recesses yet form a part of the whole molding, so that they form an anchor when molding is completed by the application of heat and pressure after the cells have been filled with molding powder in such quantity that the resulting molding will be of the desired height. Heating and pressure may be applied in any well known manner.

In some cases, particularly with cast iron or steel which are in sections, the rubber moldings may be set with the aid of a press before the section of roadway is sent to be fitted in its place in the road.

Pre-cast concrete sections may be treated in like manner.

What I claim and desire to secure by Letters Patent is:—

The method of making a composite rubber article having parts of different degrees of hardness which comprises molding into an integral structure portions of powdered rubber vulcanized to different degrees of hardness and positioned relatively to each other as desired.

FRANCIS NORMAN PICKETT.